United States Patent
Koenig et al.

(10) Patent No.: US 11,815,051 B2
(45) Date of Patent: Nov. 14, 2023

(54) METHOD FOR ACTUATING A DOSING VALVE, TANK VENTILATION SYSTEM, AND MOTOR VEHICLE

(71) Applicant: Bayerische Motoren Werke Aktiengesellschaft, Munich (DE)

(72) Inventors: Michael Koenig, Breitenbrunn (DE); Stefan Praun, Neuried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/430,509

(22) PCT Filed: Feb. 12, 2020

(86) PCT No.: PCT/EP2020/053525
§ 371 (c)(1),
(2) Date: Aug. 12, 2021

(87) PCT Pub. No.: WO2020/165201
PCT Pub. Date: Aug. 20, 2020

(65) Prior Publication Data
US 2022/0136463 A1 May 5, 2022

(30) Foreign Application Priority Data
Feb. 13, 2019 (DE) .................... 10 2019 103 544.9

(51) Int. Cl.
*F02M 25/08* (2006.01)
*F02D 41/00* (2006.01)

(52) U.S. Cl.
CPC ....... *F02M 25/0809* (2013.01); *F02D 41/003* (2013.01)

(58) Field of Classification Search
CPC .......................... F02M 25/0809; F02D 41/003
See application file for complete search history.

(56) References Cited

U.S. PATENT DOCUMENTS

| | | | |
|---|---|---|---|
| 2005/0217671 A1* | 10/2005 | Fisher | A61M 16/204 128/205.13 |
| 2007/0056568 A1 | 3/2007 | Clemens | |
| 2009/0078238 A1 | 3/2009 | Ueda et al. | |
| 2011/0067487 A1* | 3/2011 | Haag | B60K 15/03519 73/40 |

(Continued)

FOREIGN PATENT DOCUMENTS

| | | | | |
|---|---|---|---|---|
| DE | 102008052583 A1 * | 4/2010 | | F25B 45/00 |
| DE | 11 2006 001 897 B4 | 11/2013 | | |

(Continued)

OTHER PUBLICATIONS

International Search Report (PCT/ISA/210) issued in PCT Application No. PCT/EP2020/053525 dated May 12, 2020 with English translation (four (4) pages).

(Continued)

*Primary Examiner* — Joseph J Dallo
(74) *Attorney, Agent, or Firm* — Crowell & Moring LLP

(57) ABSTRACT

A method actuates a dosing valve of a tank ventilation system. The dosing valve is opened not only once but twice at every activation time, and thus a generated pressure wave is depleted. An associated tank ventilation system and an associated motor vehicle make use of the method.

10 Claims, 3 Drawing Sheets

(56) References Cited

U.S. PATENT DOCUMENTS

| | | | | |
|---|---|---|---|---|
| 2011/0139261 A1* | 6/2011 | Closet | ................ | F02M 25/0809 |
| | | | | 137/12 |
| 2017/0312378 A1* | 11/2017 | Goncalves | .............. | A61L 2/208 |
| 2018/0244148 A1* | 8/2018 | Arras | .................. | F02M 25/0836 |
| 2019/0368434 A1 | 12/2019 | Asanuma | | |

FOREIGN PATENT DOCUMENTS

| | | | |
|---|---|---|---|
| DE | 10 2016 204 131 A1 | 9/2017 | |
| EP | 2199586 A2 * | 6/2010 | ......... F02M 25/0809 |
| EP | 3 176 419 A1 | 6/2017 | |
| WO | WO-02068764 A1 * | 9/2002 | ............. A47K 11/02 |
| WO | WO-2008080692 A1 * | 7/2008 | .............. F01N 11/00 |
| WO | WO-2010046005 A1 * | 4/2010 | .............. F25B 45/00 |
| WO | WO-2010108798 A1 * | 9/2010 | ......... F02M 25/0809 |
| WO | WO-2011067180 A1 * | 6/2011 | ......... F02D 41/0032 |
| WO | WO-2013053574 A2 * | 4/2013 | ......... F02M 25/0809 |
| WO | WO-2013178384 A1 * | 12/2013 | ........... F01N 3/2066 |
| WO | WO 2018/096815 A1 | 5/2018 | |
| WO | WO-2019057866 A1 * | 3/2019 | ......... F02D 41/0007 |
| WO | WO-2020078789 A1 * | 4/2020 | ........... F02D 41/003 |

OTHER PUBLICATIONS

German-language Written Opinion (PCT/ISA/237) issued in PCT Application No. PCT/EP2020/053525 dated May 12, 2020 (eight (8) pages).

German-language Search Report issued in German Application No. 10 2019 103 544.9 dated Dec. 16, 2019 with an English translation (12 pages).

* cited by examiner

METHOD FOR ACTUATING A DOSING VALVE, TANK VENTILATION SYSTEM, AND MOTOR VEHICLE

BACKGROUND AND SUMMARY OF THE INVENTION

The technology disclosed here relates to a method for actuating a dosing valve of a tank ventilation system, wherein the dosing valve is incorporated between a filter of the tank ventilation system and an engine suction connection. The technology disclosed here furthermore relates to an associated tank ventilation system and an associated motor vehicle.

It is known that, even at moderate temperatures, gasoline has a tendency to release relevant quantities of gaseous fractions. In order to dissipate pressure generated as a result, such that there is no impending risk to the integrity of a tank, tank ventilation systems are typically provided which are connected to ambient air. Since fuel however typically contains hydrocarbons which are hazardous to the environment and to health, it is necessary to filter an escaping gas stream. For this purpose, use is typically made of an activated carbon filter which, owing to its large surface area, absorbs the hydrocarbons or other hazardous gaseous substances.

It is however also known that the typical receiving capacity of such activated carbon filters is far too low to make it sufficient for the activated carbon filter to be exchanged at sensible time intervals, for example upon workshop visits. Rather, it is necessary for the activated carbon filter to be actively emptied, wherein the hydrocarbons situated therein are fed for combustion in the engine. It is basically thus ensured that said hydrocarbons are burned in the correct manner and are thus no longer hazardous. Furthermore, in this way, the contained energy content is fully utilized.

Here, the feed of hydrocarbons for combustion in the engine should be as continuous as possible. Assemblies responsible for such a feed are commonly referred to as parts of the tank ventilation system. A dosing valve, which can for example also be referred to as tank ventilation valve, is typically significantly involved here. Such a valve is subject to various, in some cases conflicting demands. Here, it is relevant in particular that, on the one hand, there should be as low a pressure loss as possible with a high mass flow rate, which necessitates large cross sections, whereas, on the other hand, the finest possible dosing capability should be provided at correspondingly critical engine operating points.

It is known in the prior art for this problem to be solved by means of pulse width modulation (PWM) actuation. Here, for example, a magnet armature of the dosing valve is actuated by means of a rectangular signal in order, in the case of low demanded mass flow rates, to open the valve several times per second for only a few milliseconds. Another type of construction of valves, also referred to as linear valves, set their magnet armatures into a considerably higher-frequency vibration and thus allow control of the mass flow. However, in the case of low throughputs, it is also necessary in this case to switch to low-frequency cycling.

It has been found that, in the case of embodiments known from the prior art, a vibrating air column can arise in the tank ventilation system, which is caused by the low-frequency valve actuation. This harbors the risk of various flaps and check valves in the tank system as a whole being subjected to excitation, which can be transmitted by airborne and body-borne sound via a tank bubble and various attachment parts into an interior of the respective vehicle. Here, in many applications, the pulsation is so intense that damping by means of resonators or other components is not possible in the available structural space. An increase of the actuation frequency is possible only to a limited extent because a certain dead time always elapses before the opening of the valve. Also, even the frequency range that can be utilized to that effect places a considerable additional burden on the valve owing to switching cycles in the range of several hundred million. Many further measures are problematic simply because they adversely affect other demands on the tank ventilation system. New developments are fundamentally investment-intensive and afflicted by considerable quality risks.

It is a preferred object of the technology described here to alleviate or eliminate at least one disadvantage of a previously known solution, or to propose an alternative solution. In particular, it is a preferred object of the technology disclosed here to actuate a dosing valve of a tank ventilation valve such that pressure waves are advantageously dissipated. Further preferred objects may arise from the advantageous effects of the technology disclosed here. The object(s) is/are achieved by means of the subject matter of the independent patent claims. The dependent claims constitute preferred refinements.

The technology disclosed here relates to a method for actuating a dosing valve of a tank ventilation system, wherein the dosing valve is incorporated between a filter of the tank ventilation system and an engine suction connection.

The method has the following steps:
- setting a repetition frequency, which specifies a multiplicity of activation times, setting a first opening duration, setting a closing duration and setting a second opening duration,
- at every activation time
- opening the dosing valve for the first opening duration, then
- closing the dosing valve for the closing duration, then
- opening the dosing valve for the second opening duration, and then
- closing the dosing valve.

In embodiments known from the prior art, it was typically only possible to specify a repetition frequency, which specifies activation times, and possibly an opening duration to be used at every individual activation time. This corresponds to the typical implementation of pulse width modulation.

If the method is implemented in the manner disclosed here, then it is additionally possible to specify the closing duration and a second opening duration that can be used during the execution of the method for controlling the dosing valve.

In the case of the implementation disclosed here, it is thus not sufficient to provide parameters or variables for the repetition frequency and an opening duration in a unit which executes the method. Rather, it is furthermore necessary for corresponding parameters or variables for the closing duration and the second opening duration to be provided.

The dosing valve may in particular be incorporated in a pipe or a line which extends between the filter and engine suction connection. The engine suction connection typically serves for being connected to an engine or to an air inlet or an intake line of the engine, such that the engine can generate a negative pressure at the engine suction connection. In this way, when the dosing valve is open, a negative pressure is also generated at the filter, which is typically connected to the surrounding atmosphere such that, when a negative pressure prevails at the engine suction connection, air flows from the surrounding atmosphere through the filter and through the dosing valve to the engine suction connection. Said air flows through the filter and, in so doing, removes the hydrocarbons contained therein. This allows efficient cleaning of the filter.

In particular, the filter may be an activated carbon filter.

The repetition frequency is typically a variable which is to be specified in the unit of hertz or 1/s and which commonly specifies a multiplicity of respective activation times. Intervals between the respective activation times are in this case typically always equal.

According to the invention, the dosing valve, after the second opening duration, remains closed until the next activation time. This may be expedient in particular if, as already mentioned, only a first opening duration and a second opening duration and a single closing duration are used. This corresponds to an embodiment in which the dosing valve is opened for a further time after the first opening at an activation time.

Through the provision of the second opening duration, it can be achieved that a pressure wave that possibly forms in the tank ventilation system can, during the second opening duration, be entirely or partially, typically at least largely, depleted. The transmission of corresponding vibrations to other components, which can lead to possibly undesired disturbing noises in the vehicle interior, is effectively prevented in this way. A similar advantage cannot be achieved by simply doubling the repetition frequency, because, in this case, separate setting of the closing duration and of the second opening duration would not be possible, and it is therefore not possible to react to an individual propagation characteristic of the respective pressure wave.

According to an alternative embodiment, which constitutes an independent aspect of the invention, a third opening duration and a further closing duration are also set, wherein, at every activation time, the following steps are carried out after the second opening duration:

closing the dosing valve for the further closing duration, then opening the dosing valve for the third opening duration, and then closing the dosing valve until the next activation time.

Such an embodiment may be advantageous in particular if it is the intention to specify three opening durations, that is to say if, after a respective activation time, the valve is to be opened in targeted fashion not only once, as in the prior art, or twice, as in the embodiment already described further above, but even three times, in particular in order to dissipate the abovementioned pressure wave.

It is to be understood that use may also be made of basically any higher number of opening durations and respective closing durations preceding these.

In particular, a respective opening duration and a closing duration respectively preceding or following these may chronologically directly adjoin one another.

In a preferred embodiment, the first opening duration and the closing duration together differ from half of the time interval between two activation times. In this way, a delimitation with respect to a doubled repetition frequency can be suitably achieved. Typically, the first opening duration and the closing duration together are shorter than half of the time interval between two activation times.

It is preferable if all opening durations and closing durations together are shorter than the time interval between two activation times. This allows a clear chronological delimitation between the processes that take place after every respective activation time.

The repetition frequency preferably has a value between 1 Hz and 100 Hz. For example, use may also be made of lower limits of 2 Hz, 5 Hz, 10 Hz or 20 Hz. It is for example also possible for 80 Hz, 50 Hz or 30 Hz to be used as upper limits. The stated lower and upper limits may be combined with one another as desired to form a respective interval. In particular, the repetition frequency may have a value of 10 Hz. Such values have proven advantageous for typical applications.

It is preferable if the first opening duration and/or the second opening duration and/or the third opening duration and/or the closing duration and/or the further closing duration have a length between 4 ms and 40 ms. Further possible lower limits may for example be 5 ms, 10 ms or 15 ms. Further possible upper limits may for example be 20 ms, 30 ms or 50 ms. The stated lower and upper limits may be combined with one another as desired to form a respective interval. In particular, the stated opening and closing durations may each have a value of, for example, 15 ms or 20 ms. Such values have proven advantageous for typical applications.

The first opening duration, the closing duration and the second opening duration may in particular be set such that, during the second opening duration, a pressure wave that forms during the first opening duration and propagates in the tank ventilation system is allowed to pass through, or is partially allowed to pass through, by the dosing valve. In particular, the corresponding pressure wave can be at least predominantly allowed to pass through. This can be identified for example on the basis of a pressure change in the profile with respect to time. In this way, and advantageous dissipation of the corresponding pressure wave is achieved, such that the formation of the undesired vibrations already mentioned above is prevented in an effective manner.

According to the invention, the second opening duration is shorter than the first opening duration. In this way, the first opening duration is typically associated with that opening of the valve which allows the major part of the desired air quantity to pass through, whereas the second opening duration serves substantially for the dissipation of the pressure wave that forms, wherein it is self-evidently nevertheless the case that gas flows through the dosing valve also during the second opening duration. It has been found that, in typical situations, a second opening duration which is shorter in relation to the first opening duration is sufficient to dissipate the pressure wave that forms. If a third opening duration is provided, this may, in typical implementations, be even shorter than the first opening duration and/or the second opening duration.

In particular, it may be provided that every opening duration is shorter than every preceding opening duration. Alternatively, other ratios of the opening durations may however also be provided; for example, the second opening duration may also be equal to or longer than the first opening duration. Such embodiments constitute independent aspects of the invention.

The technology disclosed here furthermore relates to a tank ventilation system. The tank ventilation system has a filter. The tank ventilation system has a ventilation line for the ventilation of a tank, wherein the ventilation line is connected to the filter. The tank ventilation system has an engine suction connection, and furthermore has a connecting line between engine suction connection and filter. Furthermore, the tank ventilation system has a dosing valve which is incorporated in the connecting line. Here, the tank is typically not part of the tank ventilation system.

By means of the embodiment of a tank ventilation system described immediately above, the filter can be cleaned, as already described further above, by virtue of a negative pressure prevailing at the engine suction connection and air thus being drawn through the filter, the connecting line and the dosing valve to the engine suction connection, wherein said air cleans the filter. In particular, hydrocarbons contained in the filter can be removed in the process.

The tank ventilation system has an electronic control device which is configured to carry out a method disclosed here. With regard to the method disclosed here, use may be made of all embodiments and variants described herein.

The advantages already described further above can be achieved by means of the tank ventilation system. In particular, the filter, which typically stores hydrocarbons, can be easily cleaned, and pressure waves that form in the process can be dissipated. In this way, the vibrations already described further above, which can lead to possible disturbing noises, can be prevented.

The filter may in particular be an activated carbon filter. Such filters have proven successful for typical tank ventilation systems. Other filters may however also be used.

The technology disclosed here furthermore relates to a motor vehicle having an internal combustion engine, having a tank for storing fuel for the internal combustion engine, and having a tank ventilation system disclosed here for the ventilation of the tank. Such a motor vehicle comprises a tank ventilation system disclosed here and can thus achieve the advantages already mentioned further above. In particular, as already described above, a pressure wave that forms can be dissipated, and vibrations can be prevented. With regard to the tank ventilation system disclosed here, use may be made of all embodiments and variants described herein.

The technology disclosed here furthermore relates to a control device which is configured to carry out a method disclosed here. The technology disclosed here furthermore relates to a nonvolatile computer-readable memory medium on which there are stored program instructions which, when executed by a microprocessor, cause the latter to carry out a method disclosed here. With regard to the method, use may be made of all embodiments and variants described herein.

It can basically be stated that, by means of targeted actuation of a tank ventilation valve or of a dosing valve, a flow can be slowed by means of targeted multiple actuation. In the context of a multiple injection, after the closure of the valve for the "main injection", the tank ventilation valve can be opened for a further time in order for the generated overpressure of the accumulating air column to be depleted via the valve. In this way, the formation of reflected waves can be considerably reduced, and thus the pulsation intensity of the vibration can be dampened.

Further features and advantages will emerge to a person skilled in the art from the exemplary embodiment that is described below with reference to the appended drawing.

DETAILED DESCRIPTION OF THE DRAWINGS

Figure 1:
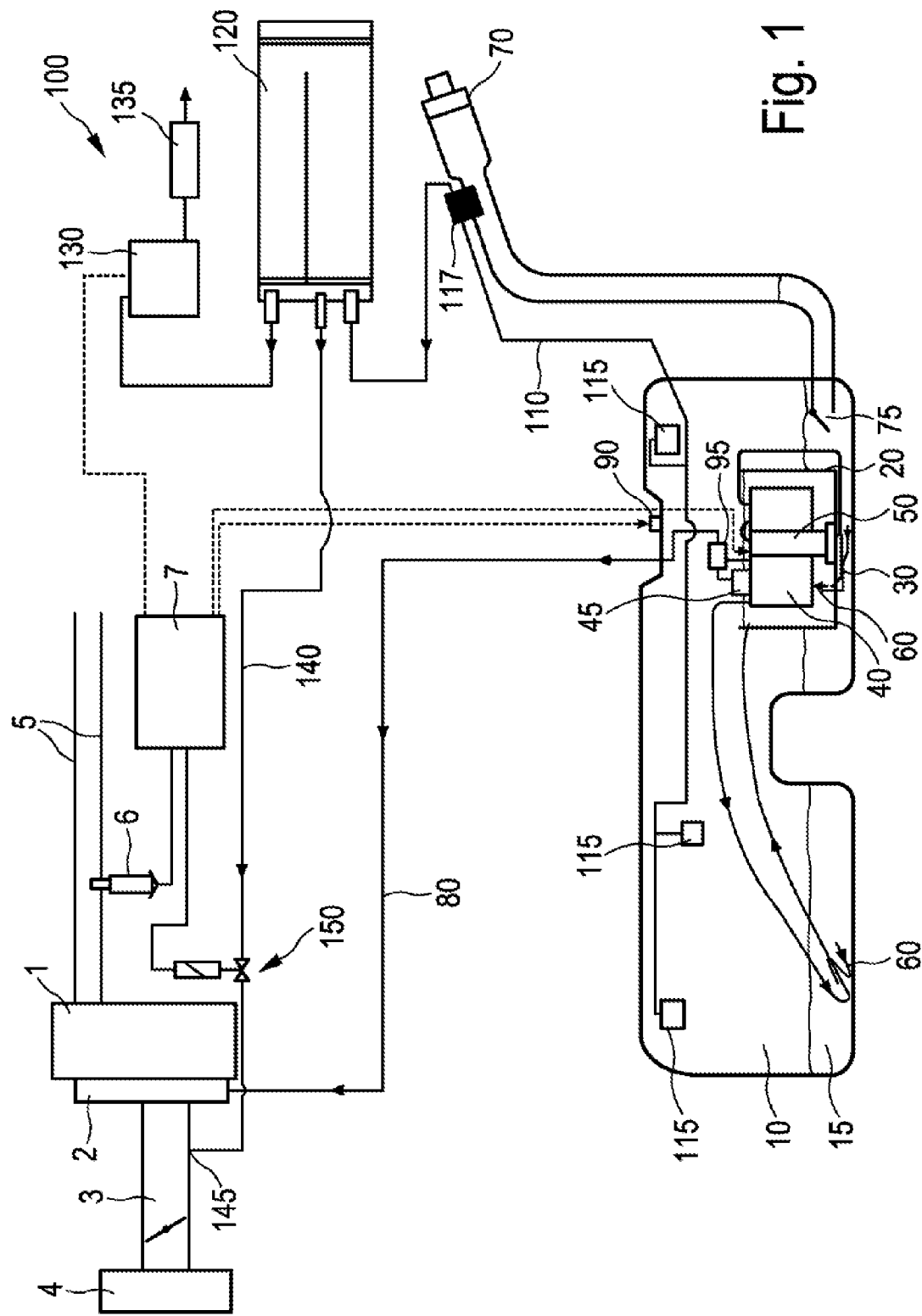
FIG. 1 shows a tank ventilation system with further components in an installation situation.

FIG. 1 shows an internal combustion engine 1 with further components, a tank 10 with further components, and a tank ventilation system 100 according to an exemplary embodiment. These constituent parts, and the further components, will be described below. The components shown may in particular be part of a motor vehicle according to an exemplary embodiment.

The internal combustion engine 1 is a conventional internal combustion engine of a motor vehicle. In particular, this may be a gasoline engine, because the components described below can be particularly advantageously used in the case of a gasoline engine. It may however also be some other internal combustion engine.

Attached to the internal combustion engine 1 is an injection rail 2, to which there is in turn connected an intake line 3. The intake line 3 is connected to an air filter 4.

The internal combustion engine 1 is furthermore connected to an exhaust system 5, to which an oxygen sensor 6 is connected. The oxygen sensor 6 measures the oxygen concentration in the exhaust gas in order to be able to control the internal combustion engine 1 in an ideal manner. This is performed by an engine control unit 7, which performs different control functions for the engine 1 and further illustrated components, wherein one part of this functionality will be discussed in more detail further below.

For the supply of fuel, a tank 10 is provided in which liquid fuel 15 is situated. This may be in particular gasoline, in the case of which the embodiment provided here can be particularly advantageously used.

Situated in the tank 10 is a swirl pot 20 in which fuel 15 is likewise situated. The swirl pot 20 is assigned a filling valve 30, and a fuel filter 40, with pressure-maintaining valve 45 arranged thereon, and a fuel pump 50 are also situated in said swirl pot. Also provided in the tank 10 is a jet pump 60 which likewise serves for filling the swirl pot 20 and for circulating fuel 15.

For filling purposes, a filler neck 70 is connected to the tank 10, which filler neck is connected via a flap 75 to the interior of the tank 10.

A fuel line 80 connects the tank 10 to the internal combustion engine 1 or to the injection rail 2. In this way, the internal combustion engine 1 can draw fuel 15 out of the tank 10.

For the control and monitoring of the tank 10, an intelligent module 90 and a fuel pressure regulator 95 are also provided. The intelligent module 90 and the fuel pump 50 may be controlled, as shown, by the engine control unit 7.

For the ventilation of the tank 10, a tank ventilation system 100 according to an exemplary embodiment is provided. This, too, is controlled by the engine control unit 7, which thus serves simultaneously as a control device for the tank ventilation system 100.

The tank ventilation system 100 has a ventilation line 110. This is connected by means of a total of three valves 115 to the interior of the tank 10. In this way, air or contained gases can pass from the interior of the tank 10 into the ventilation line 110.

The tank ventilation system 100 has an activated carbon filter 120. This is connected via a water and vapor separator 117 to the ventilation line 110. In this way, air can pass from the interior of the tank 10 into the activated carbon filter 120.

The activated carbon filter 120 is furthermore connected via a vacuum leak detector 130 and a dust filter 135 to the ambient air. In this way, air can pass from the interior of the tank 10 via the activated carbon filter 120 into the environment. Any contained hydrocarbons or other undesired substances that could lead to environmental damage or other problems in the ambient air are in this case collected in an effective manner in the activated carbon filter 120. The latter has a very large surface area on which such substances can be retained.

Since the activated carbon filter 120 becomes increasingly laden with hydrocarbons and other substances during operation, or during ventilation processes, and cannot regenerate itself, it is necessary for the hydrocarbons and other undesired substances contained in this activated carbon filter to be removed at regular intervals. Since most of the substances that are typically situated in the activated carbon filter 120 are hydrocarbons and other substances that are in any case a constituent part of the fuel 15, it is expedient for these to be fed to the internal combustion engine 1 for combustion.

For this purpose, use is made of a connecting line 140 which leads from the activated carbon filter 120 to an engine intake connection 145, which is in turn connected to the intake channel 3. Since the internal combustion engine 1 generates a negative pressure in the intake channel 3, this negative pressure also acts on the activated carbon filter 120, whereby air is conducted through the activated carbon filter 120, which air removes the hydrocarbons and other substances stored in this activated carbon filter.

For the control of this gas stream, a dosing valve 150 is incorporated in the connecting line 140. Said dosing valve may be controlled by the engine control unit 7. It is basically possible here, through suitable cycling of said dosing valve 150, to control the volume flow from the activated carbon filter 120 to the internal combustion engine 1. This will be discussed in more detail below.

Figure 2:
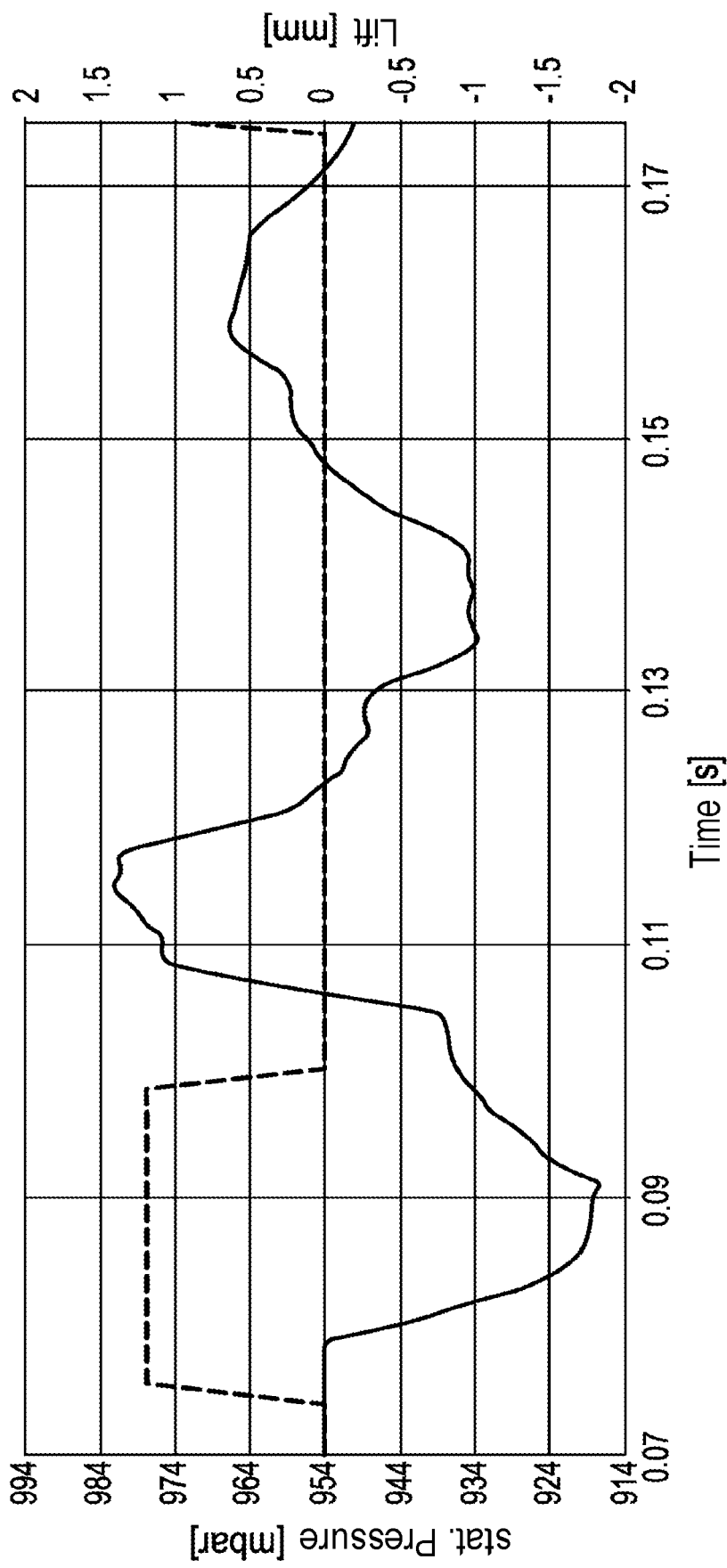
FIG. 2 shows typical profiles of a valve lift and of a pressure wave.

FIG. 2 shows the profile with respect to time of a valve lift of the dosing valve 150 (dashed line) according to the prior art, and an associated typical pressure curve (solid line) in the connecting line 140. It can be seen here that, at an activation time, the dosing valve 150 is opened once for a certain opening time and is then closed again. Here, a negative pressure wave initially forms, as indicated by a falling pressure. A positive pressure wave subsequently forms, leading to a pressure increase above the prior steady-state level. The pressure then falls again into a negative pressure wave, and phases out in further harmonic oscillations.

It has been found that it is specifically the positive pressure wave that directly follows the opening time that is significantly responsible for vibrations which can also stimulate other components to vibrate and can generate an undesired and unpleasant introduction of noise into an interior of a motor vehicle.

Figure 3A:
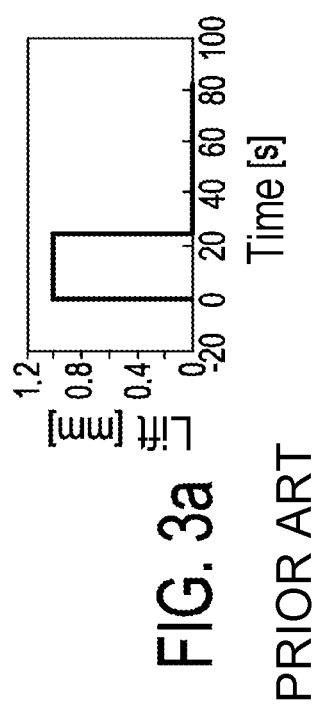
FIG. 3a shows a valve lift according to the prior art.
Figure 3B:
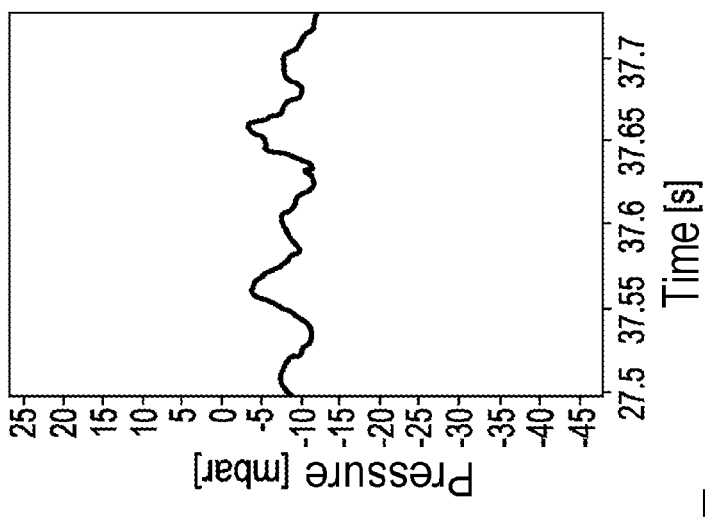
FIG. 3b shows a pressure profile according to the prior art.

FIG. 3*a* shows a further possible profile of a valve lift in embodiments according to the prior art. Here, too, only one opening time is provided. FIG. 3*b* shows an associated pressure profile, wherein the positive pressure wave that forms, and the further harmonic oscillations, can be clearly seen.

Figure 4A:
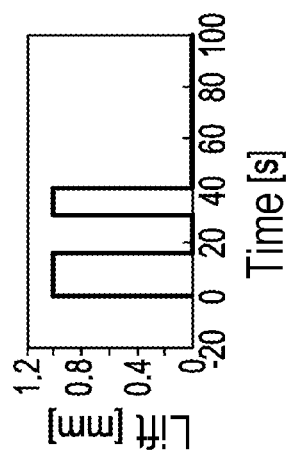
FIG. 4a shows a valve lift according to the method disclosed here.

FIG. 4*a* shows a valve lift according to an exemplary embodiment. Here, it can be seen that, firstly, the valve is opened for a first opening duration, is then closed for a closing duration, and is then opened again for a second opening duration. Here, the second opening duration is shorter than the first opening duration.

Figure 4B:
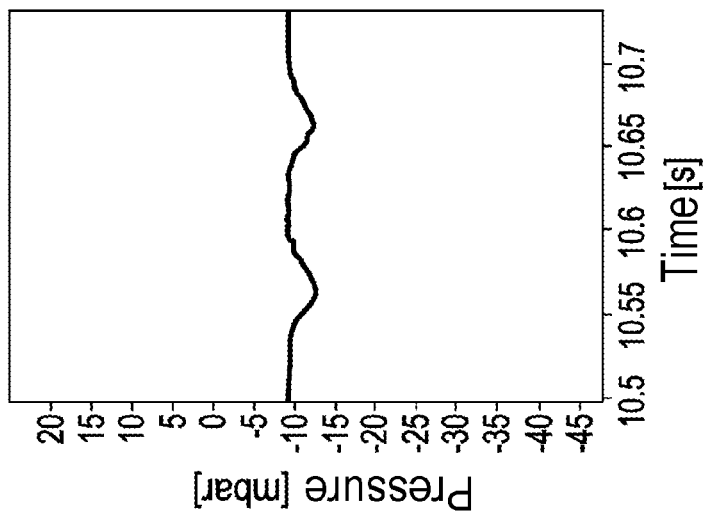
FIG. 4b shows a pressure profile according to the method disclosed here.

FIG. 4*b* shows an associated pressure profile. It can be seen here that the positive pressure wave that directly follows the first opening duration does not form to nearly as great an extent as is the case in embodiments according to the prior art. The harmonic oscillations also do not form to nearly as great an extent as illustrated for example in FIGS. 2 and 3*b*. Thus, by means of the embodiment disclosed here with a first opening duration, a second opening duration and an interposed closing duration, the pressure profile is flattened considerably, which is effective in preventing the abovementioned undesired vibrations and generation of noise.

It is ultimately thus possible by means of corresponding configuration of the engine control unit 7 for the problem of the vibrations to be eliminated, because the pressure wave is depleted in an effective manner through the provision of a second opening duration.

What is claimed is:

1. A method for actuating a dosing valve of a tank ventilation system, wherein the dosing valve is incorporated between a filter of the tank ventilation system and an engine suction connection, the method comprising the steps of:
    setting a repetition frequency, which specifies a multiplicity of activation times that are separated by time intervals,
    setting a first opening duration,
    setting a closing duration,
    setting a second opening duration, wherein the second opening duration is shorter than the first opening duration, and
    within each time interval and beginning at each activation time:
        opening the dosing valve for the first opening duration, then
        closing the dosing valve for the closing duration, then opening the dosing valve for the second opening duration, and then
        closing the dosing valve,
    wherein the dosing valve, after the second opening duration, remains closed until the next activation time.

2. The method according to claim 1,
    wherein the first opening duration and the closing duration together differ from half of the time interval between two activation times.

3. The method according to claim 1,
    wherein all of the opening durations and closing durations together are shorter than the time interval between two activation times.

4. The method according to claim 1,
    wherein the repetition frequency has a value between 1 Hz and 100 Hz, or a value of 10 Hz.

5. The method according to claim 1,
    wherein at least one of the first opening duration, the second opening duration, or the closing duration have a length between 4 ms and 40 ms, or a length of 15 ms or 20 ms.

6. The method according to claim 1,
    wherein the first opening duration, the closing duration and the second opening duration are set such that, during the second opening duration, a pressure wave that forms during the first opening duration and propagates in the tank ventilation system is allowed to pass through, or is partially allowed to pass through, by the dosing valve.

7. An electronic control device comprising a processor and associated memory configured to actuate a dosing valve of a tank ventilation system, wherein the dosing valve is incorporated between a filter of the tank ventilation system and an engine suction connection, wherein the electronic control device is configured to:

set a repetition frequency, which specifies a multiplicity of activation times that are separated by time intervals,
    set a first opening duration,
    set a closing duration,
    set a second opening duration, wherein the second opening duration is shorter than the first opening duration, and
    within each time interval and beginning at each activation time:
        open the dosing valve for the first opening duration, then
        close the dosing valve for the closing duration, then
        open the dosing valve for the second opening duration, and then
        close the dosing valve,
    wherein the dosing valve, after the second opening duration, remains closed until the next activation time.

8. A tank ventilation system, comprising:
a filter;
a ventilation line for ventilation of a tank, wherein the ventilation line is connected to the filter;
an engine suction connection;
a connecting line between the engine suction connection and the filter;
a dosing valve which is incorporated in the connecting line; and
an electronic control device according to claim 7.

9. A motor vehicle, comprising:
an internal combustion engine;
a tank for storing fuel for the internal combustion engine; and
a tank ventilation system according to claim 8 for ventilation of the tank.

10. A computer product comprising a nonvolatile computer-readable medium having stored thereon program instructions which, when executed by a processor, causes the processor to actuate a dosing valve of a tank ventilation system, wherein the dosing valve is incorporated between a filter of the tank ventilation system and an engine suction connection, by:

setting a repetition frequency, which specifies a multiplicity of activation times that are separated by time intervals,
    setting a first opening duration,
    setting a closing duration,
    setting a second opening duration, wherein the second opening duration is shorter than the first opening duration, and
    within each time interval and beginning at each activation time:
        opening the dosing valve for the first opening duration, then
        closing the dosing valve for the closing duration, then
        opening the dosing valve for the second opening duration, and then
        closing the dosing valve,
    wherein the dosing valve, after the second opening duration, remains closed until the next activation time.

\* \* \* \* \*